(12) United States Patent
Skertic et al.

(10) Patent No.: US 10,641,121 B2
(45) Date of Patent: May 5, 2020

(54) GAS TURBINE ENGINE WITH ROTOR TIP CLEARANCE CONTROL SYSTEM

(71) Applicant: Rolls-Royce North American Technologies, Inc., Indianapolis, IN (US)

(72) Inventors: Richard J. Skertic, Carmel, IN (US); Andrew J. Eifert, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 417 days.

(21) Appl. No.: 15/657,600

(22) Filed: Jul. 24, 2017

(65) Prior Publication Data

US 2019/0024527 A1    Jan. 24, 2019

(51) Int. Cl.
| | | |
|---|---|---|
| F01D 11/24 | (2006.01) | |
| F02C 3/06 | (2006.01) | |
| F01D 5/08 | (2006.01) | |
| F02C 9/18 | (2006.01) | |
| F02C 7/18 | (2006.01) | |
| F02C 6/08 | (2006.01) | |

(52) U.S. Cl.
CPC ............ *F01D 11/24* (2013.01); *F01D 5/08* (2013.01); *F02C 3/06* (2013.01); *F02C 6/08* (2013.01); *F02C 7/185* (2013.01); *F02C 9/18* (2013.01); *F05D 2220/32* (2013.01); *F05D 2260/20* (2013.01); *F05D 2260/213* (2013.01); *F05D 2260/606* (2013.01)

(58) Field of Classification Search
CPC .... F02C 6/08; F02C 7/185; F02C 9/18; F02C 3/06; F01D 5/08; F05D 2260/213; F05D 2260/606; F05D 2260/20; F05D 2220/32
See application file for complete search history.

(56) References Cited

U.S. PATENT DOCUMENTS

| | | | | |
|---|---|---|---|---|
| 4,815,272 | A * | 3/1989 | Laurello | F01D 5/082 |
| | | | | 415/115 |
| 4,928,240 | A | 5/1990 | Davison et al. | |
| 4,967,552 | A * | 11/1990 | Kumata | F01D 5/08 |
| | | | | 415/115 |
| 5,351,732 | A * | 10/1994 | Mills | F01D 11/24 |
| | | | | 415/115 |
| 6,435,823 | B1 | 8/2002 | Schroder | |
| 6,626,635 | B1 * | 9/2003 | Prowse | F01D 11/18 |
| | | | | 415/1 |
| 7,269,955 | B2 | 9/2007 | Albers et al. | |
| 7,785,063 | B2 | 8/2010 | McQuiggan et al. | |
| 8,126,628 | B2 | 2/2012 | Hershey et al. | |
| 8,296,037 | B2 * | 10/2012 | Plunkett | F01D 11/20 |
| | | | | 60/782 |
| 8,668,431 | B2 | 3/2014 | Rog et al. | |
| 9,458,855 | B2 * | 10/2016 | Dierksmeier | F01D 11/24 |
| 9,541,008 | B2 * | 1/2017 | Reed | F02C 9/18 |
| 9,562,475 | B2 * | 2/2017 | Laurello | F02C 7/18 |
| 10,316,752 | B2 * | 6/2019 | Robson | F01D 25/12 |
| 2012/0167588 | A1 | 7/2012 | Dierksmeier et al. | |

(Continued)

*Primary Examiner* — Hung Q Nguyen
(74) *Attorney, Agent, or Firm* — Barnes & Thornburg LLP

(57) ABSTRACT

A gas turbine engine includes a turbine and a rotor tip clearance control system. The rotor tip clearance control system is configured to actively manage a clearance formed between a rotor of the turbine and a case structure of the turbine.

19 Claims, 3 Drawing Sheets

(56) References Cited

U.S. PATENT DOCUMENTS

| | | | |
|---|---|---|---|
| 2013/0104564 A1* | 5/2013 | Arar | F01D 11/24 60/782 |
| 2013/0111919 A1 | 5/2013 | Chehab et al. | |
| 2013/0283814 A1* | 10/2013 | Johns | F01D 25/14 60/782 |

* cited by examiner

GAS TURBINE ENGINE WITH ROTOR TIP CLEARANCE CONTROL SYSTEM

FIELD OF THE DISCLOSURE

The present disclosure relates generally to gas turbine engines, and more specifically to gas turbine engines including actively controlled rotor tip clearance mechanisms.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in shrouds that are arranged around the rotating wheel assemblies.

During operation, the tips of the blades included in the rotating wheel assemblies typically move inwardly and outwardly relative to a centerline of the engine due to changes in centrifugal force and temperatures experienced by the blades. Because of this movement inwardly and outwardly relative to the centerline, the case around the blades is sometimes designed to allow clearance between the blade tips and the blade tracks. This clearance may allow combustion products to pass over the blades without pushing the blades, thereby contributing to lost performance within a gas turbine engine.

SUMMARY

The present disclosure may comprise one or more of the following features and combinations thereof.

A gas turbine engine including a compressor, a combustor, and a turbine is disclosed. The compressor is configured to compress air drawn into the engine and discharge pressurized air. The combustor is configured to combust fuel in pressurized air from the compressor so as to create hot, high pressure combustion products. The turbine is configured to receive the combustion products and to extract mechanical work from the combustion products as the combustion products move through the turbine. The turbine includes a rotor with blades mounted for rotation about an axis and a case that extends around the rotor to block combustion products from moving through the turbine without interaction with the blades.

According to one aspect of the present disclosure, the gas turbine engine may include a rotor tip clearance control system. The compressor may be a multi-stage axial compressor configured to compress air drawn into the engine and discharge pressurized air. The rotor tip clearance control system may be configured to actively manage a clearance formed between the rotor and the case of the turbine using bleed air from the compressor.

In some embodiments, the rotor tip clearance control system may include a first flow modulator, a second flow modulator, and an air temperature unit. The first flow modulator may be configured to control a cool-air flow from a first bleed location within the compressor so as to control the cool-air flow. The second flow modulator may be configured to control a warm-air flow from a second bleed location within the compressor. The warm-air flow may be warmer than the cool-air flow and the second bleed location may be downstream of the first bleed location. The air temperature unit may be configured to receive the cool-air flow and the warm-air flow before discharging a mixed-air flow. The mixed air flow may be directed to the case of the turbine in order to adjust a diameter of the case based on thermal expansion or contraction induced by the mixed-air flow.

In illustrative embodiments, the air temperature unit may include a heat exchanger and a mixing valve. The heat exchanger may conduct the cool-air flow and the warm-air flow in order to cool the warm-air flow via heat exchange with the cool-air flow. The mixing valve may be configured to mix the cool-air flow from the first flow modulator with warm-air flow after it is discharged from the heat exchanger to provide the mixed-air flow.

In some embodiments, the air temperature unit may include an electronic controller coupled to the first flow modulator, the second flow modulator, and the mixing valve included in the air temperature unit so as to direct operation of the first flow modulator, the second flow modulator, and the mixing valve. The controller may be configured to direct adjustment of at least one of the first flow modulator, the second flow modulator, and the mixing valve to raise the temperature of the mixed-air flow in response to receipt of a signal indicative of a rate of change in the angle between a throttle lever and a fixed plane that exceeds a predetermined threshold.

In some embodiments, the rotor tip clearance control system may include a third flow modulator configured to control cool-air flow after its discharge from the heat exchanger. The third flow modulator may be configured to control cool-air flow directed into the blades of the rotor included in the turbine. The turbine may include static vanes and the rotor tip clearance control system may include passages configured to conduct cool-air flow to the vanes after its discharge from the heat exchanger. The rotor tip clearance control system may include passages configured to conduct cool-air flow to the blades of the rotor included in the turbine after its discharge from the heat exchanger.

According to another aspect of the present disclosure, a gas turbine engine may include a turbine and a rotor tip clearance control system. The turbine may include a rotor with blades mounted for rotation about an axis and a case that extends around the rotor to block combustion products from moving through the turbine without interaction with the blades. The rotor tip clearance control system may be configured to actively manage a clearance formed between the rotor and the case of the turbine.

In illustrative embodiments, the rotor tip clearance control system may include an air temperature unit. The air temperature unit may include a heat exchanger and a mixing valve. The heat exchanger may receive and conduct a cool-air flow and a warm-air flow. The warm-air flow may be warmer and at a higher pressure than the cool-air flow in order to cool the warm-air flow via heat exchange with the cool-air flow. The mixing valve may be configured to mix the cool-air flow with warm-air flow after the warm air flow is discharged from the heat exchanger to provide a mixed-air flow. The mixed-air flow may be delivered to the case of the turbine in order to adjust a diameter of the case based on thermal expansion or contraction induced by the mixed-air flow.

In some embodiments, the air temperature unit may include an electronic controller coupled to the mixing valve included in the air temperature unit so as to direct the mixing valve. The controller may be configured to direct adjustment of the mixing valve to raise the temperature of the mixed-air flow in response to receipt of a signal indicative of a rate of change in the angle between a throttle lever and a fixed plane that exceeds a predetermined threshold.

In some embodiments, the rotor tip clearance control system may include a first flow modulator configured to control the cool-air flow received by the heat exchanger and the mixing valve. The rotor tip clearance control system may include a second flow modulator configured to control the warm-air flow received by the heat exchanger.

In some embodiments, the rotor tip clearance control system may include a third flow modulator configured to control cool-air flow after its discharge from the heat exchanger. The third flow modulator may be configured to control cool-air flow directed into the blades of the rotor included in the turbine. The turbine may include static vanes, and the rotor tip clearance control system may include passages configured to conduct cool-air flow to the vanes after its discharge from the heat exchanger. The rotor tip clearance control system may include passages configured to conduct cool-air flow to the blades of the rotor included in the turbine after its discharge from the heat exchanger.

According to another aspect of the present disclosure, a method of operating a gas turbine engine is taught. The method may include generating a signal and adjusting a blade tip clearance control system. The signal may be indicative of a rate of change in a throttle position that exceeds a predetermined threshold such that the signal is indicative of a snap acceleration condition. The blade tip clearance control system may adjusted to direct air onto a case included in a turbine to grow the diameter of the case in anticipation of future growth of an associated rotor with blades arranged inside the case.

In some embodiments, the blade tip clearance control system may include a heat exchanger and a mixing valve. The heat exchanger may receive and conduct a cool-air flow and a warm-air flow. The warm-air flow may be warmer and at a higher pressure than the cool-air flow in order to cool the warm-air flow via heat exchange with the cool-air flow. The mixing valve may be configured to mix the cool-air flow with warm-air flow after the warm air flow is discharged from the heat exchanger to provide a mixed-air flow that is delivered to the case of the turbine in order to adjust a diameter of the case based on thermal expansion or contraction induced by the mixed-air flow.

In some embodiments, the turbine may include static vanes, and the rotor tip clearance control system may include passages configured to conduct cool-air flow to the vanes after its discharge from the heat exchanger. The rotor tip clearance control system may include passages configured to conduct cool-air flow to the blades of the rotor included in the turbine after its discharge from the heat exchanger.

These and other features of the present disclosure will become more apparent from the following description of the illustrative embodiments.

DETAILED DESCRIPTION OF THE DRAWINGS

Figure 1:
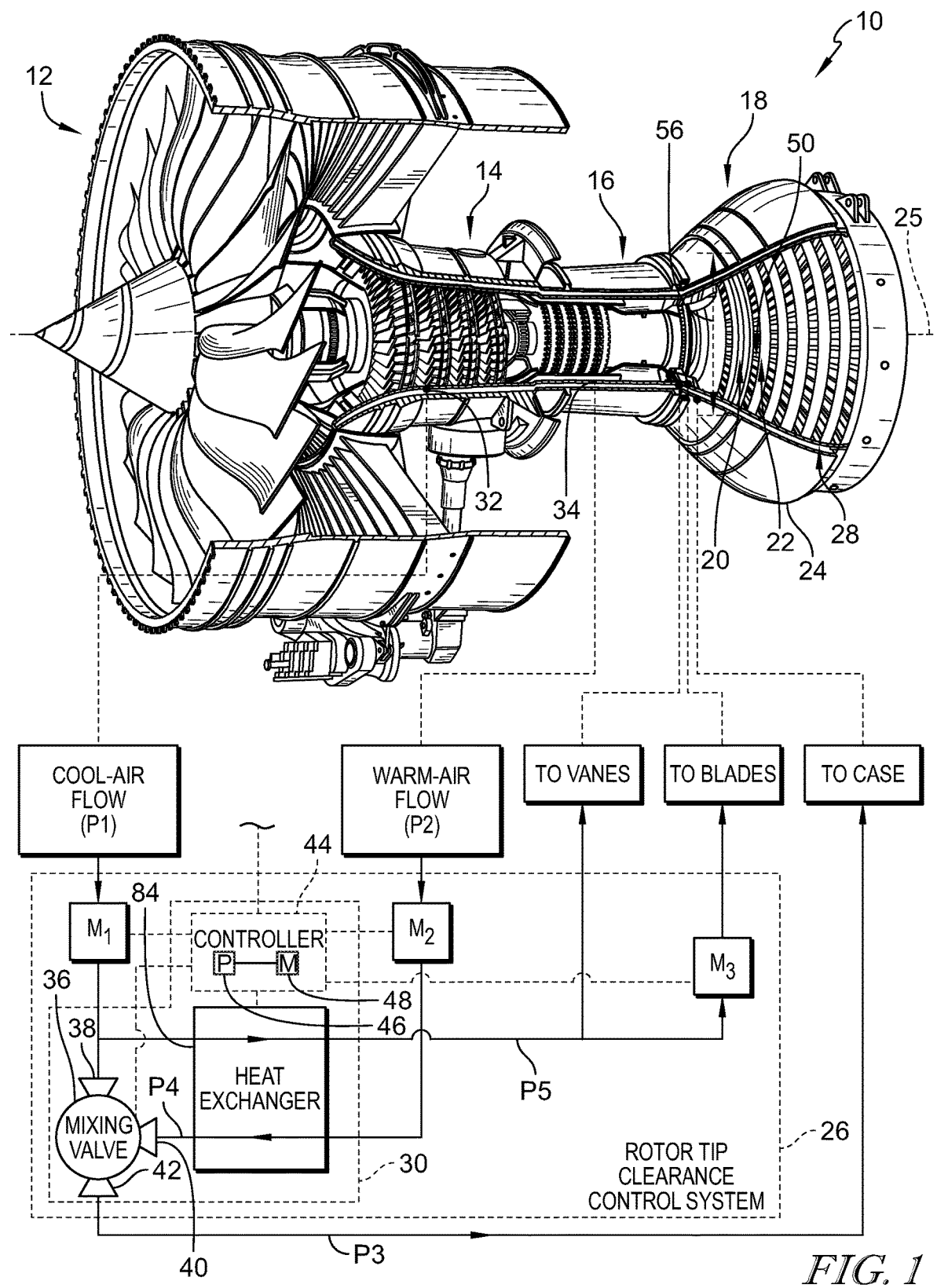
FIG. 1 is a perspective view of a gas turbine engine cut away to show that the engine includes, from left to right, a fan, a compressor, a combustor, and a turbine, and further showing diagrammatically a blade tip clearance system integrated into the engine to control a gap defined around blades in the turbine.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 draws air into the compressor 14 that compresses and delivers the air to the combustor 16. The combustor 16 mixes fuel with the compressed air from the compressor 14 and combusts the mixture. The turbine 18 includes a rotor 20 with turbine blades 22 mounted for rotation about the axis 25 and a case 24 that extends around the rotor 20 to block combustion products from moving through the turbine 18 without interaction with the blades 22. The hot, high-pressure exhaust products of the combustion reaction in the combustor 16 are directed into the turbine 18 to cause turbine blades 22 to rotate about the axis 25 and drive the compressor 14.

In the illustrative embodiment, gas turbine engine 10 includes a rotor tip clearance control system 26 as shown diagrammatically in FIG. 1. The rotor tip clearance control system 26 is configured to actively manage a clearance or gap 28 formed between the rotor 20 and the case 24 of the turbine as shown in FIG. 1. The rotor tip clearance control system 26 includes flow modulators (sometimes called valves) M1, M2 and an air temperature unit 30. The first flow modulator M1 is configured to control a cool-air flow P1 from a first bleed location 32 within the compressor 14 by increasing or decreasing the cool-air flow P1 allowed to flow through the first flow modulator M1. The second flow modulator M2 is configured control a warm-air flow P2 from a second bleed location 34 within the compressor 14 by increasing or decreasing the warm-air flow P2 allowed to flow through the second flow modulator M2. The warm-air flow P2 is bled from a location downstream of the first bleed location 32 such that the warm-air flow P2 is warmer and has a higher pressure than the cool-air flow P1.

In the illustrative embodiment, the air temperature unit 30 receives the cool-air flow P1 after the cool-air flow P1 passes through the modulator M1 and receives the warm-air flow P2 after the warm-air flow P2 passes through the modulator M2 as shown in FIG. 1. The temperature unit 30 is configured to discharge a mixed-air flow P3 made up of air from the cool-air flow P1 and the warm-air flow P2. Mixed-air flow P3 is carried to the case 24 of the turbine 18 in order to adjust a diameter 56 of the case 24 based on thermal expansion or contraction induced by the mixed-air flow P3.

In the illustrative embodiment, the air temperature unit 30 includes a heat exchanger 84 and a mixing valve 36 as shown in FIG. 1. The heat exchanger 84 is configured to selectively cool warm-air flow P2 using cool-air flow P1 as a cooling medium. The mixing valve 36 is configured to mix warm-air flow P2 (after it passes through the heat exchanger 84) with cool-air flow P1 to produce mixed-air flow P3 at a desired temperature. Mixed-air flow P3 from air temperature unit 30 is illustratively supplied to the case 24 to control diameter of the case 24 but may, in other embodiments, be supplied to other locations throughout the engine 10.

The heat exchanger 84 is coupled to the first flow modulator M1 and the second flow modulator M2 as shown in FIG. 1. The heat exchanger 84 conducts the cool-air flow P1 after the cool-air flow P1 passes through the first flow modulator M1 and conducts the warm-air flow P2 after the warm-air flow P2 passes through the second flow modulator M2. The conduction by the heat exchanger 84 cools the warm-air flow P2 by facilitating the transfer of heat from the warm-air flow P2 to the cool-air flow P1 resulting in the discharge of a cooled warm-air flow P4 and a heated cool-air flow P5.

The mixing valve 36 includes a first input 38, a second input 40, and an output 42 as shown in FIG. 1. The mixing valve is coupled to the first flow modulator M1 at the first input 38, and the mixing valve is coupled to the heat exchanger 84 at the second input 40. The mixing valve 36 is configured to mix the cool-air flow P1 from the first flow modulator M1 with the cooled warm-air flow P4 after the cooled warm-air flow P4 is discharged from the heat exchanger 84 to provide the mixed-air flow P3. The mixed-air flow P3 is discharged from the output 42 of the mixing valve 36 and provided to the case 24 of the turbine 18 in order to adjust the diameter 56 of the case 24 based on thermal expansion or contraction induced by the mixed-air flow P3.

In the illustrative embodiment, the air temperature unit 30 includes an electronic controller 44 illustratively electrically coupled to the first flow modulator M1, the second flow modulator M2, and the mixing valve 36 included in the air temperature unit 30 so as to govern operation of the first flow modulator M1, the second flow modulator M2, and the mixing valve 36 to control the temperature and flow rate of mixed-air flow P3 discharged from the output 42 of the mixing valve 36 as suggested in FIG. 1. The controller 44 illustratively includes a processor 46 and a memory device 48.

In the illustrative embodiment, the controller 44 determines a desired operation of the rotor tip clearance control system 26 based on and ahead of operational scenarios and conditions of the gas turbine engine 10 as shown in FIG. 1. The controller 44 is configured to direct adjustment of at least one of the first flow modulator M1, the second flow modulator M2, and the mixing valve 36 to raise the temperature of the mixed-air flow P3.

Figure 3:
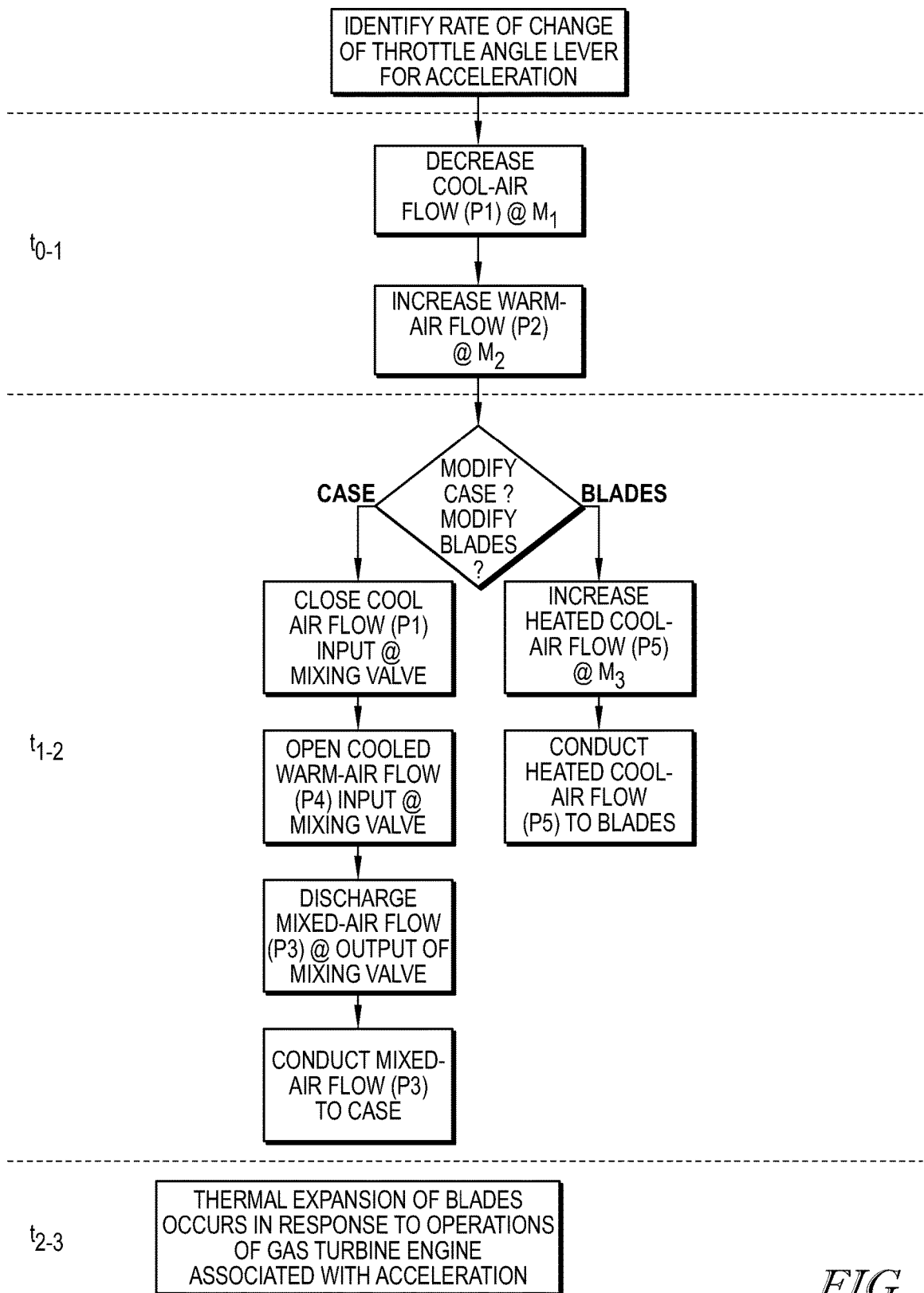
FIG. 3 is a diagram showing a method of operating the gas turbine engine of FIGS. 1 and 2.

Referring now to FIG. 1 and FIG. 3, illustratively in the context of acceleration, when the controller 44 receives a signal that indicates a rate of change of an angle (not shown) formed between a throttle lever and a fixed plane that exceeds a predetermined threshold for the rate of change, at a time t(0-1). The controller 44 illustratively directs the first flow modulator M1 to reduce the flow rate of cool-air flow P1 and illustratively directs the second flow modulator M2 to increase the flow rate of warm-air flow P2, and at a time t(1-2). The controller 44 illustratively directs the mixing valve 36 to decrease the cool-air flow P1 intake at the first input 38 and/or increase the cooled warm-air flow P4 intake at the second input 40 to increase the temperature of the mixed-air flow P3 discharged at the output 42 of the mixing valve 36. The mixed-air flow P3 is provided to the case 24 to increase the diameter 56 of the case 24 based on thermal expansion induced by the mixed-air flow P3.

Time t(0-1) occurs before time t(1-2) such that desired air flow operations can be initiated as an immediate response the signal that indicates a rate of change of an angle (not shown) formed between a throttle lever and a fixed plane. At a time t(2-3) thermal expansion of the blades 22 of the turbine 18 occurs in response to increases in centrifugal force and temperatures experienced by the blades 22 associated with acceleration. Time t(1-2) occurs before time t(2-3) such that thermal expansion of the case 24 and/or thermal contraction of the blades 22 is induced by the rotor tip clearance control system 26 in anticipation of future expansion of the blades 22 included in the turbine 18 in response centrifugal force and temperatures experienced by the blades 22 associated with acceleration, as illustratively shown in FIG. 3.

In the illustrative embodiment, the rotor tip clearance control system 26 includes a third flow modulator M3 coupled to the heat exchanger 84 as shown in FIG. 1. The third flow modulator M3 is configured to control the heated cool-air flow P5 after the heated cool-air flow P5 is discharged from the heat exchanger 84 by increasing or decreasing the heated cool-air flow P5 allowed to flow through the third flow modulator M3. The heated cool-air flow P5 that passes through the third flow modulator M3 is directed into the blades 22 of the rotor 20 included in the turbine 18 to cool the blades 22. The electronic controller 44 is illustratively electrically coupled to the third flow modulator M3 and configured to direct adjustment of the third flow modulator M3 based on operational scenarios and conditions of the gas turbine engine 10 in order to cool the blades 22.

Figure 2:
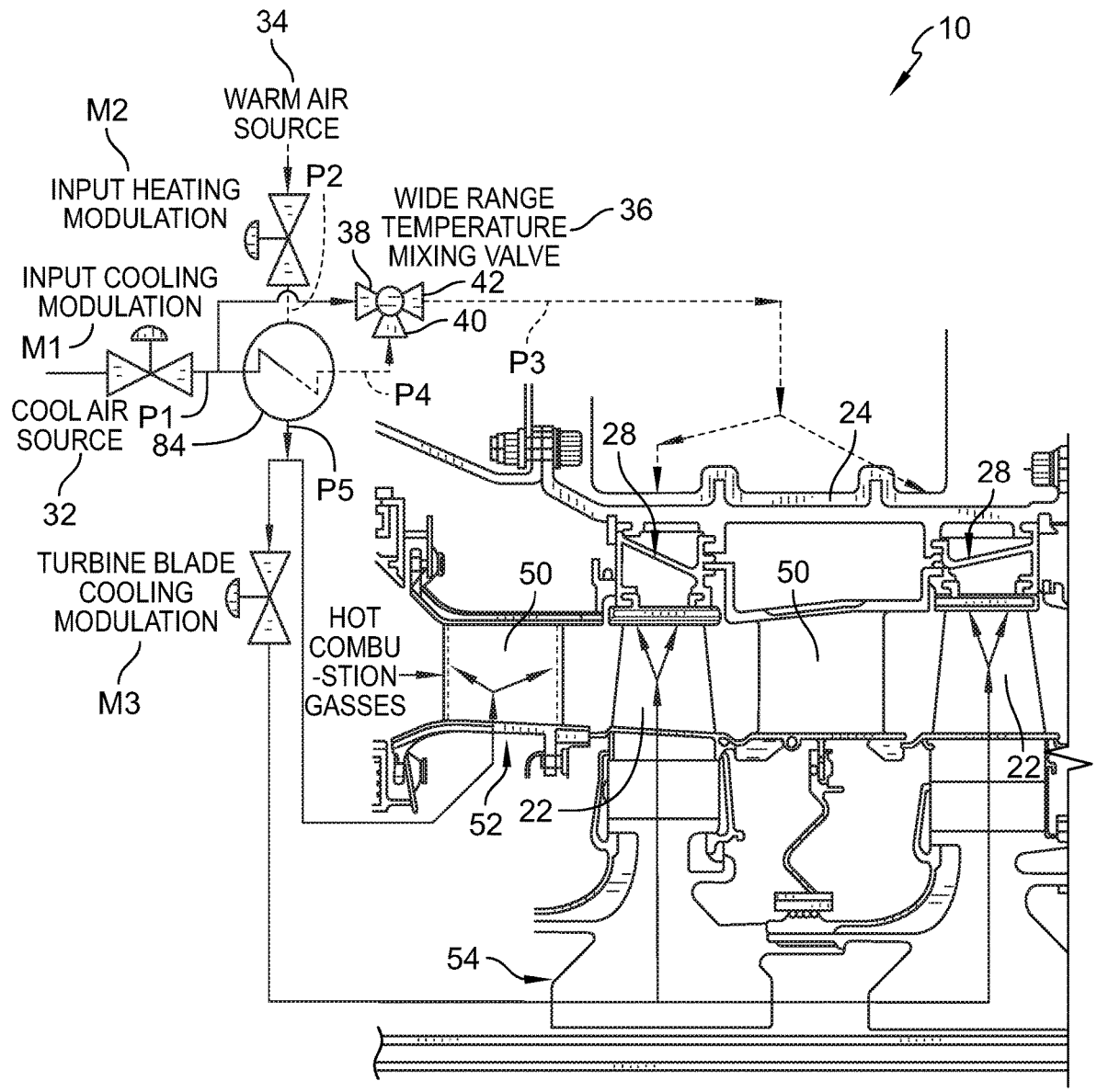
FIG. 2 is a detailed cross-sectional view of a portion of the turbine included in the engine of FIG. 1 showing that the turbine includes a case, static vanes, and blades all fluidly coupled to the blade tip clearance system, and further showing diagrammatically the blade tip clearance system.

In the illustrative embodiment, the turbine 18 includes static vanes 50 arranged axially between the blades 22 as shown in FIG. 2. The rotor tip clearance control system 26 includes passages 52 configured to conduct the heated cool-air flow P5 to the vanes 50 after the heated cool-air flow P5 is discharged from the heat exchanger 84 to cool the vanes 50. The rotor tip clearance system 26 includes passages 54 configured to conduct the heated cool-air flow P5 to the blades 22 of the rotor 20 included in the turbine 18 after the heated cool-air flow P5 is discharged from the heat exchanger 84 to cool the blades 22.

One illustrative approach to implementing a rotor tip clearance subsystem suitable for use on both large gas turbine turbofan engines and smaller turbofan or turboprop engines is provided by the illustrative rotor tip clearance control system 26. There are multiple ways to control the clearance between the turbine blade and the case structure. However many systems require a way to move the case to follow the blade or rotor. Many such systems focus on doing that through a system that regulates air flow and/or air flow and air temperature blown on the turbine case structure. In such designs, the case is often designed to 1) allow the case to move In and out radially, and 2) be manufactured from material that has a certain expansion rate. Many times selection of material for this section of the case Is selected for its expansion rate and works against movement. Engines in accordance with the present disclosure may take advantage of case movement based on thermal expansion/contraction so a material with a medium to large expansion rate may be selected.

One of the proposed features of the present disclosure is to use an external cool air source, (i.e. first stage compressor bleed) to pass through an air-to-air heat exchanger that typically will cool the high pressure flow hot airflow for use in cooling vanes. It should be noted that the cool air source is preferably clean air. Often, for turboshaft applications, external cool air that has not gone through an inlet particle separator, (IPS) will be dirty air and will damage any of the subsystems that use it. The benefit of cooling the vanes allow for increased work capability for the turbine.

Another feature of the present disclosure is the ability to modulate this cool airflow out of the heat exchanger to cool the turbine blades. This will help in regulating the thermal growth of the blades so that they can more easily be matched to the case when controlling the tip clearances gap between the turbine blades and the case structure.

Yet another feature of the present disclosure is the use of mixed air from combining the cool air source and the heated air out of the heat exchanger to condition the case and thereby to control the tip clearance gap between the turbine blades and the case structure. By using both the inner cooling of the blades as well as conditioning the case, a more precise clearance gap and rotor following can be achieved throughout a maneuver during both steady-state and transient control of the clearance gap between the blade and the case structure.

In many applications, tip clearance varies due to many factors including: rpm, gas-path temperatures, nacelle air temperatures, time-on-point, as-built component sizes. For a given condition, as the clearance increases above that necessary to avoid contact, the efficiency of that stage decreases. In addition, for compressor stages, as the clearance Increases the overall stability of the compressor decreases. For these reasons, maintaining a small (I.e. tight) tip clearance can be important.

Engines configured in accordance with the present disclosure and/or appended claims can vary the clearance across a wide variety of power settings by modulating the blade and case cooling air temperatures; and, thus, indirectly control the clearance. This present disclosure provides a system that adapted to minimize the extent of clearance variation by applying the desired coolant temperatures as engine conditions dictate.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine, the engine comprising
a multi-stage axial compressor configured to compress air drawn into the engine and discharge pressurized air,
a combustor configured to combust fuel in pressurized air from the compressor so as to create hot, high pressure combustion products,
a turbine configured to receive the combustion products and to extract mechanical work from the combustion products as the combustion products move through the turbine, the turbine including a rotor with blades mounted for rotation about an axis and a case that extends around the rotor to block combustion products from moving through the turbine without interaction with the blades, and
a rotor tip clearance control system configured to actively manage a clearance formed between the rotor and the case of the turbine, the rotor tip clearance control system including (i) a first flow modulator configured to control a cool-air flow from a first bleed location within the compressor so as to control the cool-air flow, (ii) a second flow modulator configured to control a warm-air flow from a second bleed location within the compressor, the warm-air flow being warmer than the cool-air flow and the second bleed location being downstream of the first bleed location, so as to control the warm-air flow, and (iii) an air temperature unit configured to receive the cool-air flow and the warm-air flow, the air temperature unit being configured to discharge a mixed-air flow made up of air from the cool-air flow and the warm-air flow to the case of the turbine in order to adjust a diameter of the case based on thermal expansion or contraction induced by the mixed-air flow,
wherein the air temperature unit includes (a) a heat exchanger that conducts the cool-air flow and the warm-air flow in order to cool the warm-air flow flow via heat exchange with the cool-air flow and (b) a mixing valve configured to mix the cool-air flow from the first flow modulator with warm-air flow after it is discharged from the heat exchanger to provide the mixed-air flow.

2. The engine of claim 1, wherein the air temperature unit includes an electronic controller coupled to the first flow modulator, the second flow modulator, and the mixing valve included in the air temperature unit so as to direct operation of the first flow modulator, the second flow modulator, and the mixing valve.

3. The engine of claim 2, wherein the controller is configured to direct adjustment of at least one of the first flow modulator, the second flow modulator, and the mixing valve to raise the temperature of the mixed-air flow in response to receipt of a signal indicative of a rate of change in throttle position that exceeds a predetermined threshold.

4. The engine of claim 1, wherein the rotor tip clearance control system includes (iv) a third flow modulator configured to control cool-air flow after its discharge from the heat exchanger.

5. The engine of claim 4, wherein the third flow modulator is configured to control cool-air flow directed into the blades of the rotor included in the turbine.

6. The engine of claim 1, wherein the turbine includes static vanes and wherein the rotor tip clearance control system includes passages configured to conduct cool-air flow to the vanes after its discharge from the heat exchanger.

7. The engine of claim 6, wherein the rotor tip clearance control system includes passages configured to conduct cool-air flow to the blades of the rotor included in the turbine after its discharge from the heat exchanger.

8. A gas turbine engine, the engine comprising
a turbine including a rotor with blades mounted for rotation about an axis and a case that extends around the rotor to block combustion products from moving through the turbine without interaction with the blades, and
a rotor tip clearance control system configured to actively manage a clearance formed between the rotor and the case of the turbine and the rotor tip clearance control system includes an air temperature unit,
wherein the air temperature unit includes (a) a heat exchanger that receives and conducts a cool- air flow and a warm-air flow, the warm-air flow being warmer and at a higher pressure than the cool-air flow, in order to cool the warm-air flow via heat exchange with the cool-air flow and (b) a mixing valve configured to mix the cool-air flow with warm-air flow after the warm air flow is discharged from the heat exchanger to provide a mixed-air flow that is delivered to the case of the turbine in order to adjust a diameter of the case based on thermal expansion or contraction induced by the mixed-air flow.

9. The engine of claim 8, wherein the air temperature unit includes an electronic controller coupled to the mixing valve included in the air temperature unit so as to direct the mixing valve.

10. The engine of claim 9, wherein the controller is configured to direct adjustment of the mixing valve to raise the temperature of the mixed-air flow in response to receipt of a signal indicative of a rate of change in throttle position that exceeds a predetermined threshold.

11. The engine of claim 8, wherein the rotor tip clearance control system includes a first flow modulator configured to control the cool-air flow received by the heat exchanger and the mixing valve.

12. The engine of claim 11, wherein the rotor tip clearance control system includes a second flow modulator configured to control the warm-air flow received by the heat exchanger.

13. The engine of claim 12, wherein the rotor tip clearance control system includes a third flow modulator configured to control cool-air flow after its discharge from the heat exchanger.

14. The engine of claim 13, wherein the third flow modulator is configured to control cool-air flow directed into the blades of the rotor included in the turbine.

15. The engine of claim 8, wherein the turbine includes static vanes and wherein the rotor tip clearance control system includes passages configured to conduct cool-air flow to the vanes after its discharge from the heat exchanger.

16. The engine of claim 15, wherein the rotor tip clearance control system includes passages configured to conduct cool-air flow to the blades of the rotor included in the turbine after its discharge from the heat exchanger.

17. A method of operating a gas turbine engine, the method comprising
generating a signal indicative of a rate of change in throttle position that exceeds a predetermined threshold such that the signal is indicative of a snap acceleration condition, and
adjusting a blade tip clearance control system to direct air onto a case included in a turbine to grow the diameter of the case in anticipation of future growth of an associated rotor with blades arranged inside the case,
wherein the blade tip clearance control system includes (a) a heat exchanger that receives and conducts a cool-air flow and a warm-air flow, the warm-air flow being warmer and at a higher pressure than the cool-air flow, in order to cool the warm-air flow via heat exchange with the cool-air flow and (b) a mixing valve configured to mix the cool-air flow with warm-air flow after the warm air flow is discharged from the heat exchanger to provide a mixed-air flow that is delivered to the case of the turbine in order to adjust a diameter of the case based on thermal expansion or contraction induced by the mixed-air flow.

18. The method of claim 17, wherein the turbine includes static vanes and wherein the rotor tip clearance control system includes passages configured to conduct cool-air flow to the vanes after its discharge from the heat exchanger.

19. The method of claim 18, wherein the rotor tip clearance control system includes passages configured to conduct cool-air flow to the blades of the rotor included in the turbine after its discharge from the heat exchanger.

* * * * *